United States Patent [19]

Trebinger et al.

[11] 3,904,787

[45] Sept. 9, 1975

[54] PROCESS FOR HYDROPHOBIZATION OF SILICATES

[75] Inventors: Karl Trebinger; Gottfried Kallrath, both of Wesseling, Germany

[73] Assignee: Deutsche Gold- und Silber-Scheideanstalt vormals Roessler, Germany

[22] Filed: Aug. 6, 1973

[21] Appl. No.: 385,733

[30] Foreign Application Priority Data

Aug. 31, 1972 Germany............................ 2242728

[52] U.S. Cl. ......... 427/220; 106/308 Q; 260/42.15; 427/379
[51] Int. Cl.² ......................................... B05D 1/00
[58] Field of Search............ 117/100 S, 123 C, 119.6

[56] References Cited
UNITED STATES PATENTS

| | | | |
|---|---|---|---|
| 2,306,222 | 12/1942 | Patnode ........................ | 117/106 R |
| 2,589,705 | 3/1952 | Kistler ............................ | 117/100 S |
| 2,668,151 | 2/1954 | Pedlow et al. .................. | 117/100 S |
| 2,784,110 | 3/1957 | Tatlock........................... | 117/100 S |
| 2,802,850 | 8/1957 | Wetzel............................ | 117/100 S |
| 2,859,198 | 11/1958 | Sears et al. .................... | 117/100 S |
| 3,130,070 | 4/1964 | Potters et al. .................. | 117/100 S |
| 3,649,320 | 3/1972 | Yates.............................. | 117/100 S |

*Primary Examiner*—William D. Martin
*Assistant Examiner*—Dennis C. Konopacki
*Attorney, Agent, or Firm*—Cushman, Darby & Cushman

[57] ABSTRACT

Metal silicates of Groups II to IV of the periodic system are hydrophobized by treating an aqueous suspension of the silicate with an organohalosilane with intensive stirring at 15° to 70° C. The precipitate is then filtered, washed, dried and tempered at 200° to 500° C.

16 Claims, No Drawings

PROCESS FOR HYDROPHOBIZATION OF SILICATES

BRIEF SUMMARY OF THE INVENTION

The invention is directed to a process of hydrophobization of silicates of metals of Groups II to IV of the periodic system through action of materials which can react with the free OH groups of the silicate in the aqueous precipitation-suspension. Thus, as silicates there can be used water insoluble silicates such as calcium silicate, aluminum silicate, magnesium silicate, zinc silicate, lead silicate, calcium-aluminum silicate, barium silicate, etc.

BRIEF DESCRIPTION OF THE PRIOR ART

For the production of reinforced vulcanizates of natural or synthetic rubber and for the reinforcing of synthetic resins and plastic materials there are generally used as fillers in addition to highly dispersed carbon blacks other reinforcingly effective finely divided inorganic materials, especially oxides of metals or metalloids or synthetic or natural silicates. This type of filler is primarily of importance for colored, white or transparent rubber or synthetic resin products in which the black color of carbon has a disturbing effect. For this reason, highly dispersed inorganic white or colorless fillers which have been produced for example pyrogenically from the aerosol condition or by precipitation have found an increasingly wide use.

Numerous products of this type are different in character from the carbon black previously used for this purpose, for example they differ because of their hydrophilic or acid properties — at least on their surfaces. Therefore, their processing in many cases makes necessary the use of special conditions which especially include a change in dosage of the vulcanization additives for example the accelerator, or in the concomitant use of special plasticizers or new types of wetting agents.

In addition to such conditions, it is also known to load with alkaline acting materials, for example amines, finely divided silica which has been produced synthetically and whose surface is acid in character. Furthermore, it has been proposed to neutralize with stearic acid the surface of magnesium oxide which is used as a filler. In this case, there are formed on the surfaces of the filler particles compounds which can be compared somewhat with salts.

It is further known to treat at least partially in a topochemical reaction synthetic silicates with organic compounds which are capable of reacting with hydroxyl groups to form ethers, esters or acetates. These silicates still have on their surfaces and partially also internally, a considerable number of free hydroxyl groups which can react with these organic materials.

According to these known processes, the silicates before treatment with organic materials are first subjected to the action of chlorinating agent such as thionyl chloride. These types of chlorinatingly treated silicates are especially easily accessible to further working up. As organic materials for the further treatment of the silicates with free OH groups there are usable alcohols, aldehydes, ketones and alkylene oxides. For example, the action of the organic materials on silicates can take place either discontinuously or continuously. This type of process can be carried out by reacting the organic reaction partners simultaneously with, or directly after, the precipitation from the preferably aqueous reaction mixture.

These types of treated silicates to be sure are better workable than untreated silicates in elastomers. However, the products retain this activity for only a limited time, so that they must be worked up in the shortest possible time after production.

It is further known to emulsify silicone oils in amounts up to 10 percent in a sodium silicate solution and to precipitate therefrom a modified silicate with a metal salt which forms a difficulty soluble compound with the silicic acid. The treatment must be carried out with a suspension in an organic solvent.

It is also known to hydrophobize silicates by volatilization of organohalosilanes or to cause the hydrophobization by esterification with alcohols at elevated temperatures.

By these known processes the large active surfaces of the finely divided silicates are covered with as dense as possible a layer of organic groups. The hydroxyl groups are bound or screened off by the organic groups so that these types of modified silicates are no longer fully effective as active fillers upon addition to elastomers or other polymers. Besides after the breakdown of the relatively thin organic layer they very quickly lose hydrophobic properties. Furthermore, the required processes are partially very cumbersome and time-consuming. This is especially true for those processes in which a recovery of the organic solvent is necessary.

DETAILED DESCRIPTION

The invention proceeds from the problem of developing a process for hydrophobization of silicates of metals of Groups II to IV of the periodic system by the action of materials reactable with the free OH groups of the silicate on the aqueous precipitation suspension, which process leads to unobjectionable hydrophobic products with reduced thickening possibilities whereby their properties as active fillers are essentially retained.

The characteristic feature of the invention is that there is introduced into the silicate precipitation suspension an organohalogenosilane with intensive stirring at a temperature in the range of 15° to 70° C. and the precipitated product is tempered in the range of 200° to 500° C. after filtering, washing and drying.

Good hydrophobic products can be obtained according to the invention from calcium silicate, aluminum silicate or barium silicate or the other silicates of metals of Groups II to IV of the periodic system set forth above.

As organohalogenosilanes there can be used mono-, di- and tri-halogenoorganosilanes. There can also be added mixtures of the materials. As especially suitable hydrophobization materials there are employed dimethyldichlorosilane and a mixture of about 70 percent dimethyl dichlorosilane and 30 percent methyl trichlorosilane. The hydrophobic properties of the products obtained are improved by tempering at temperatures between 200° and 500° C.

In addition to the organohalogenosilanes mentioned above, there can also be used, for example, other lower alkyl organohalogenosilanes such as trimethylchlorosilane, methyl trichlorosilane, triethylchlorosilane, diethyldichlorosilane, ethyltrichlorosilane, propyltrichlorosilane, dipropyldichlorosilane, n-butyltrichlorosilane, di-n-butyldichlorosilane, tri-n-butyl chlorosilane, amyltrichlorosilane, diisopropyldichlorosilane, methyl ethyl dichlorosilane, dimethyldibromosilane, trimethylbromosilane, methyltribromosilane, diethyldibromosilane, as well as higher alkyl organohalogenosilanes such as dodecyltrichlorosilane, bis dodecyl dichlorosilane, cetyl trichlorsilane, dicetyl dichlorosilane, octadecyl trichlorsilane, bis octadecyl dichlorosilane and arylhalogenosilane such as diphenyldichlorosilane, triphenylchlorosilane, phenyltrichlorosilane, diphenyl dibromosilane, methyl phenyl dichlorosilane, methyl diphenyl chlorosilane.

The products obtained are suited for many uses. Thus, they can be added for the improvement in flowability of powdery materials. Since the thickening behaviour of the silicate can be influenced by the treatment with the halogenoorganosilanes, it is possible to attain with the silicates organic systems having higher degrees of filler. For this purpose the treatment need not be carried out to complete hydrophobicity. Also, the use of a smaller amount of silane than was formerly required for this purpose will reduce the possibility of thickening. Of course, the hydrohobic halogenoorganosilane treated silicates of the invention can be used with natural or synthetic rubber, e.g., GR-S, polyisoprene, etc. or with synthetic resins as reinforcing agents.

Unless otherwise indicated all parts and percentages are by weight.

The invention is further illustrated by the following Examples.

EXAMPLE 1

1 liter of a freshly precipitated aqueous suspension of aluminum silicate (60 g/l) was treated with 12 grams of dimethyldichlorosilane at room temperature. The silane was introduced through a dip tube into the suspension which was thoroughly stirred with a stirrer. After filtration, washing and drying there were obtained 56 grams of powder which could only be poorly wet with water. By 1 hour's heating to 400° C. the hydrophobic properties were so improved that even after several hours of shaking with water only a small part (<5%) of the powder went into the aqueous phase.

The properties of the dimethyldichlorosilane treated silicate after the heating to 400° C. were as follows:

| | |
|---|---|
| BET - Surface Area | 80 m$^2$/g |
| Apparent Density | 45 g/l |
| Particle Size | < 10 millimicrons |

EXAMPLE 2

An experiment was carried out as in Example 1, but using a precipitated aqueous suspension of calcium silicate (80 g/l) the hydrophobization temperature chosen was 60° C. Hydrophobization was carried out with 10 grams of a mixture consisting of 70 percent dimethyldichlorosilane and 30 percent methyltrichlorosilane. After filtering, washing, drying and heating to 400° C. the silicate product had the following properties:

| | |
|---|---|
| BET - Surface Area | 4.5 m$^2$/g |
| Apparent Density | 60 g/l |
| Particle Size | < 15 millimicrons |

EXAMPLE 3

20 liters of an aqueous suspension of aluminum silicate (52g/l) were treated with 50 grams of dimethyldichlorosilane in the manner described in Example 1. After the drying and subsequent tempering at 400° C. there was obtained a product which could be dispersed in water but which, upon shaking with water insoluble organic solvents, e.g., went into the organic phase. The tempered product had the following properties:

| | |
|---|---|
| BET - Surface Area | 105 m$^2$/g |
| Apparent Density | 65 g/l |
| Particle Size | < 20 millimicrons |

What is claimed is:

1. A process for the hydrophobization of a silicate of a metal of Group II to Group IV of the periodic system comprising reacting the free hydroxyl groups of the silicate in the form of an aqueous suspension of a precipitate thereof with an organohalogenosilane with intensive stirring at a temperature of 15° to 70° C, and drying the treated silicate.

2. A process according to claim 1 wherein the silane is an organochlorosilane.

3. A process according to claim 2 wherein the silane is a lower alkyl mono-, di- or tri-chlorosilane.

4. A process according to claim 3 including tempering the dried silicate at 200° to 500° C.

5. A process according to claim 4 wherein the silane consists of dimethyldichlorosilane.

6. A process according to claim 4, wherein the silane is a mixture of about 70 percent dimethyldichlorosilane and about 30 percent methyltrichlorosilane.

7. A process according to claim 4, wherein the silicate is aluminum silicate, calcium silicate or barium silicate.

8. A process according to claim 7 wherein the silane is a member of the group consisting of methyltrichlorsilane, dimethyldichlorosilane and trimethylchlorosilane.

9. A process according to claim 8 wherein the silane is dimethyldichlorosilane and the silicate is aluminum silicate.

10. A process according to claim 8 wherein the silane is a mixture of dimethyl dichlorsilane and methyltrichlorosilane and the silicate is calcium silicate.

11. A process according to claim 1 wherein the silicate consists of a silicate of calcium, aluminum, barium, magnesium, zinc or lead.

12. A process according to claim 11 wherein the silicate is a silicate of calcium, aluminum or barium.

13. A process according to claim 1 wherein the reaction is carried out in a mixture consisting of water, said silicate and said organohalogenosilane.

14. A process according to claim 13 wherein after the treatment with the silane the silicate is dried and then tempered at 200° to 500°C.

15. A process according to claim 14 wherein the silicate is aluminum silicate, calcium silicate or barium silicate.

16. A process according to claim 15 wherein the silane is a member of the group consisting of methyltrichlorosilane, dimethyldichlorosilane and trimethylchlorosilane.

* * * * *